Figure 1:
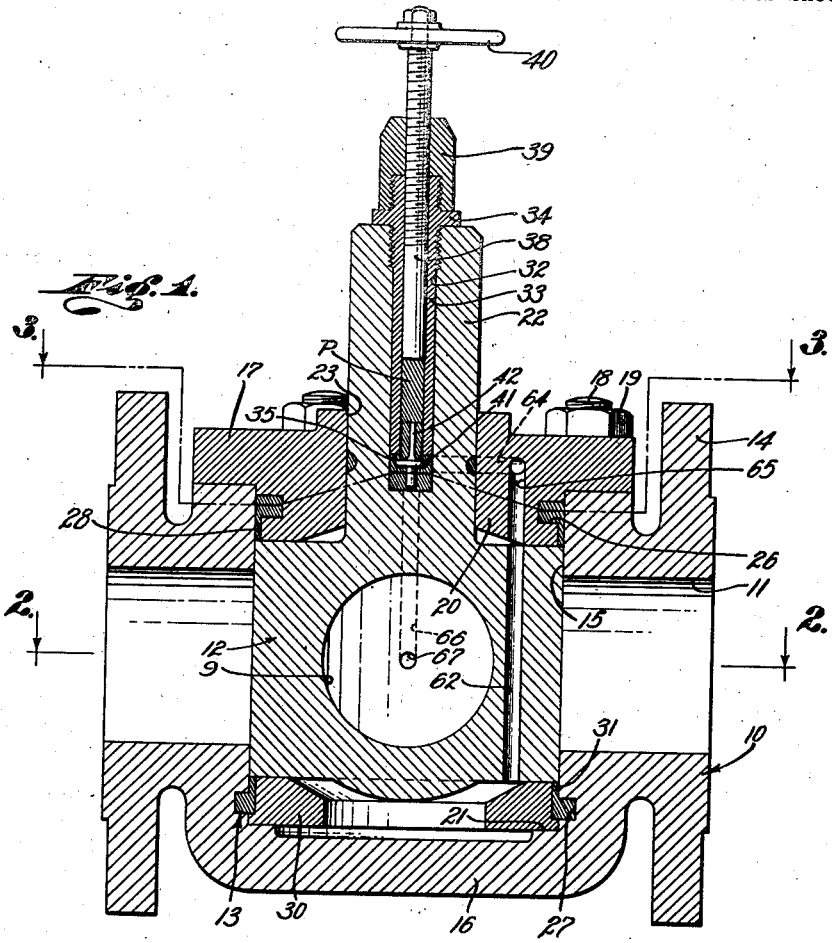

July 22, 1941.   S. C. CARTER   2,250,124
PLUG VALVE
Filed May 7, 1940   2 Sheets-Sheet 1

Inventor
Samuel C. Carter
By
His Attorney

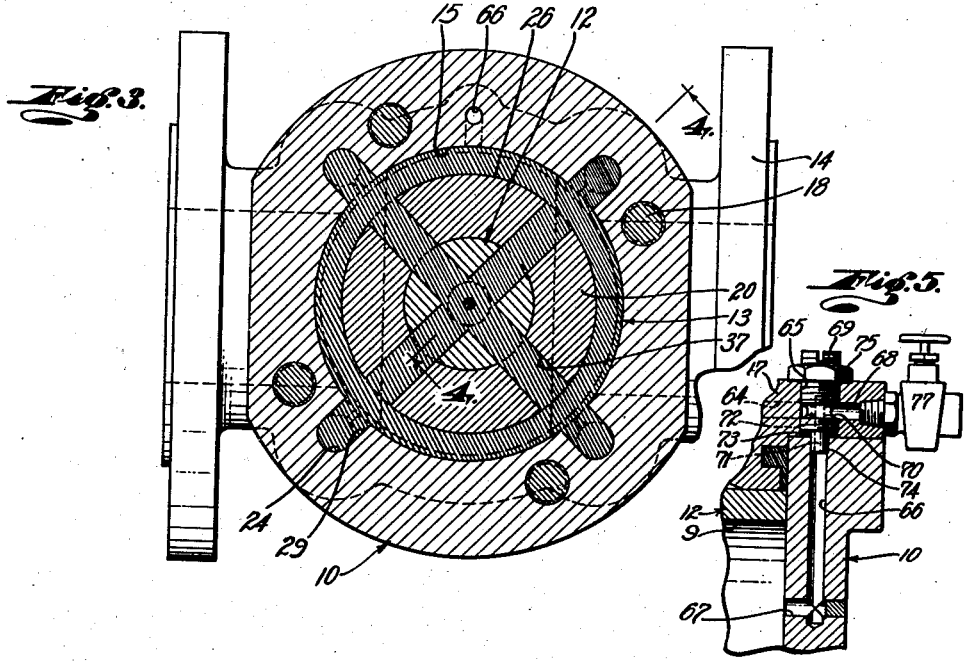
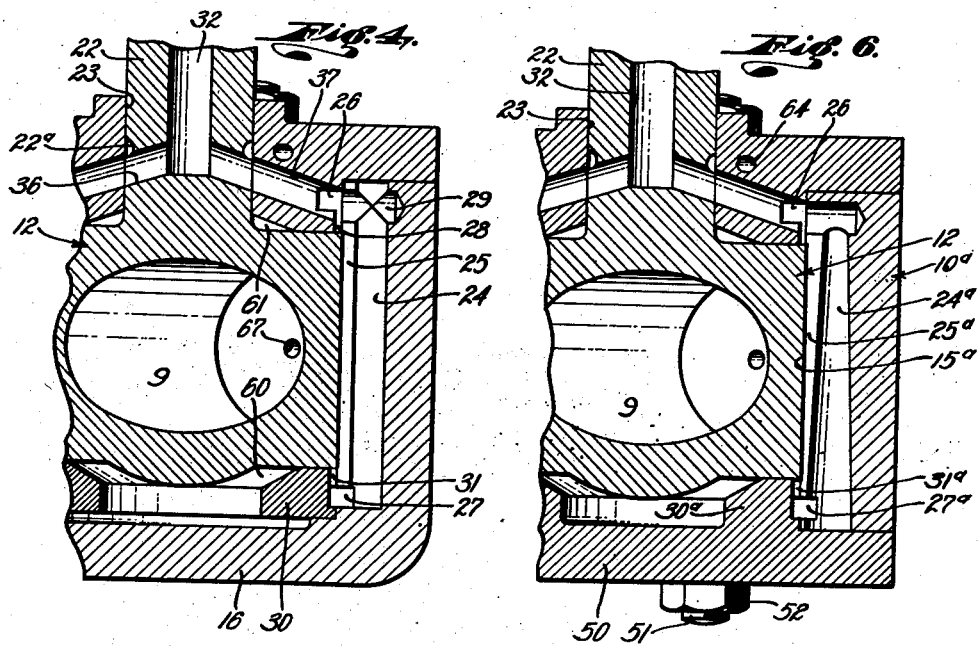

Patented July 22, 1941

2,250,124

UNITED STATES PATENT OFFICE 2,250,124

PLUG VALVE

Samuel C. Carter, Los Angeles, Calif.

Application May 7, 1940, Serial No. 333,727

11 Claims. (Cl. 251—103)

This invention relates to valves and relates more particularly to valves of the plug cock or stop cock class. A general object of this invention is to provide a practical and particularly effective valve of this character.

Great difficulty has been encountered in providing a practical stop cock or plug valve that will assure a tight seal or shut off and yet will be easy to operate. Where a tight seal has been obtained there has been difficulty in operating or turning the plug and where the valve has been constructed to assure easy plug operation there has been leakage or loss of pressure. Plug valves have been introduced embodying lubricating means for supplying lubricant under pressure to the sealing faces and thus form what is termed a lubricant seal, the intention being to overcome the sticking of the metal to metal sealing surfaces and to maintain a film of lubricant to act as a seal. Such lubricated plug valves are not practical or successful, particularly where the fluid handled is under high pressures, is at a high temperature, or dissolves the lubricant. The lubricant of such valves washes away, leaks away, and is penetrated by the fluid under pressure, resulting in leakage and loss of pressure. Furthermore, lubricated plug valves are costly and cumbersome.

Another object of this invention is to provide a plug cock embodying means for forming fluid tight and pressure tight seals that are impervious to and unaffected by practically all fluids, unaffected by high temperatures and do not interfere with the free operation or turning of the plug.

Another object of this invention is to provide a plug valve that does not depend upon the direct metal to metal contact of the valve parts or the sealing action of a lubricant but embodies means for forming metallic sealing gaskets between the plug parts and the body parts that are effective in preventing the leakage of fluid and pressure and that do not interfere with the free operation of the plug.

Another object of the invention is to provide a plug cock of the character referred to embodying a novel system of bleeder ports whereby the valve may be easily tested to determine if there is leakage at any point.

Another object of this invention is to provide a plug cock in which novel means are provided to produce metallic sealing gaskets between the surfaces of the body and the plug to assure dependable seals making it unnecessary to bring the surfaces of the body and plug into wedging cooperation or pressure engagement and making the use of common gaskets, packing glands, etc. unnecessary at the bonnet and the stem of the plug.

Another object of this invention is to provide a plug valve in which the plug may be a simple, cylindrical part that is inexpensive to manufacture and easy to turn under all pressure and temperature conditions.

Another object of this invention is to provide a plug valve in which the cylindrical plug is substantially balanced at all times to be free for easy rotation, there being no end pressures on the plug or its stem to interfere with free operation.

Another object of this invention is to provide a plug valve of the character referred to embodying novel means for distributing the gasket forming packing material to the sealing chambers and ing packing material to the sealing chambers and channels.

A further object of this invention is to provide a plug valve capable of effectively handling fluids at very high pressures that is simple and inexpensive of manufacture.

Figure 2:
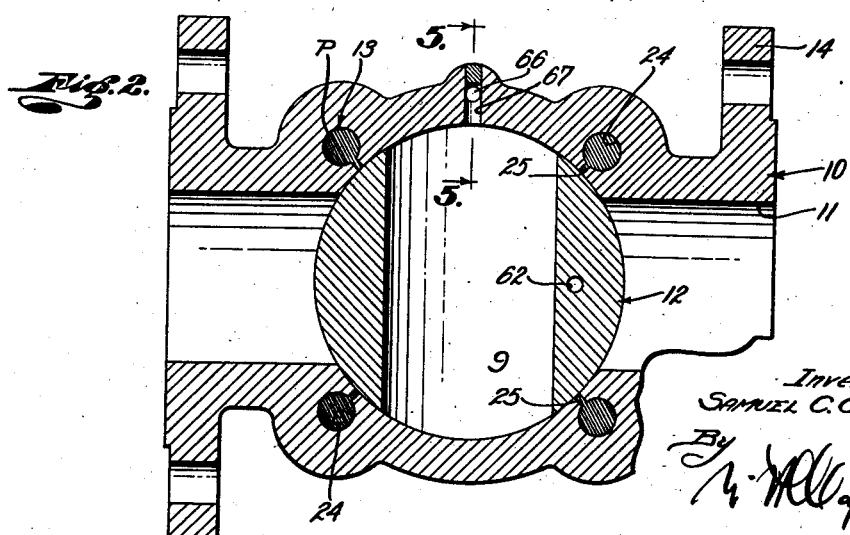

The various objects and features of my invention will be fully understood from the following detailed description of typical preferred forms and applications of my invention, throughout which description reference is made to the accompanying drawings, in which:

Fig. 1 is a central vertical detailed sectional view of the plug valve showing the plug in the closed position. Fig. 2 is a fragmentary horizontal detailed sectional view taken as indicated by line 2—2 on Fig. 1. Fig. 3 is a transverse detailed sectional view taken substantially as indicated by line 3—3 on Fig. 1, illustrating a portion of the system of packing carrying ports. Fig. 4 is a fragmentary vertical detailed sectional view taken substantially as indicated by line 4—4 on Fig. 3, the packing being omitted to better illustrate the port system. Fig. 5 is a fragmentary vertical detailed sectional view taken as indicated by line 5—5 on Fig. 2 and Fig. 6 is a view similar to Fig. 4 illustrating a modified form of construction, the packing being omitted to better illustrate the port system.

The improved plug valve of this invention may be said to comprise, generally, a body 10 having a fluid passage 11, a plug 12 in the body 10 for controlling the passage 11, and packing means 13 for sealing between the body 10 and the plug 12.

The body 10 is adapted to be connected in a pipe line or conduit and may be varied somewhat to adapt it for different installations. In the particular case illustrated the opposite ends of the body 10 are provided with flanges 14 for mating with typical pipe line flanges. The body fluid passage 11 is a cylindrical opening extending longitudinally through the body 10 from one end to the other to have its ends occur at the flanges 14 for communication with the pipe line. A transverse socket or opening 15 is provided in the body 10 to intersect the fluid passage 11. In accordance with the invention the opening 15 is cylindrical as distinguished from the tapered openings of the usual plug cocks. The opening 15 extends downwardly from the upper end of the body 10 and its lower end is closed by an integral body wall 16. A bonnet or head 17 is secured to the upper end of the body 10 by studs 18 and nuts 19. The head 17 may directly seat on the flat top surface of the body 10, there being no need for gaskets at this point as the packing means 13 of the invention serves to prevent the leakage of fluid from under the head. The head 17 is provided with an inwardly projecting boss 20 fitting or occupying the upper portion of the opening 15. The lower or inner end of the opening 15 is provided with a flat upwardly facing seat 21.

The plug 12 is arranged in the opening 15 to control or close the body passage 11. It is a feature of the invention that the plug 12 may be a simple cylindrical part. The cylindrical plug 12 is proportioned and finished to fit the body opening 15 with suitable working clearance, it being a feature that the plug need not closely fit the walls of the opening. An opening 9 extends transversely through the plug 12 to register with the passage 11 when the plug is in the open position. The upper and lower ends of the plug 12 may be in whole or in part flat, and are spaced above and below the fluid passage 11. A central stem 22 extends upwardly from the top of the plug 12 passing through a central opening 23 in the head 17. The plug stem 22 projects upwardly beyond the head 17 and its projecting portion is formed for engagement by a turning tool or carries a suitable handle means. In the typical case illustrated the projecting portion of the stem 22 is flat sided for engagement by a wrench or the like. It will be observed that no packing is required around the plug stem 22, the improved packing means 13 of the invention serving to prevent the leakage of fluid upwardly around the stem.

The packing means 13 is an important feature of the invention. The packing means 13 employs or includes a metallic or partially metallic packing material P that is solid at normal pressures and temperatures and that is capable of limited distortion and flow only when subjected to very high pressures. In practice I prefer to employ a packing material of the general character described in Letters Patent No. 2,183,347 granted to myself and Julian A. Campbell, on December 12, 1939. The packing means 13 includes a system of ports and chambers in the body structure for handling the semi-solid or partially plastic packing material P. The character and materials of the packing P may, of course, be varied. In some cases the packing P may be a mixture of lead flakes and synthetic rubber. This system of ports and passages includes four equally spaced vertical ports 24 in the body 10 spaced outwardly or radially from the wall of the body opening 15 and occurring at the opposite sides of the passage 11. As illustrated in Figs. 2 and 3 of the drawings there are two spaced ports 24 at each side of the fluid passage 11 in spaced adjacent relation to the lines of juncture of the passage 11 and the opening 15. The ports 24 may extend downwardly from the upper end of the body 10 to adjacent the plane of the bottom of the opening 15. In the form of the invention being described the ports 24 are straight cylindrical bores and each has a slot 25 joining or leading to the opening 15, see Fig. 2. The slots 25 are continuous and may extend throughout the length of the ports 24. In the preferred arrangement the slots 25 have flat parallel walls and the slots are quite narrow. The packing P discharged or extruded through the slots 25 seals against the surface of the plug 12 and is distorted laterally from the sides of the slots 25 to form vertical sealing gaskets. These sealing gaskets are at opposite sides of the passage 11 at both the upstream sides of the plug 12 to positively prevent the leakage of fluid around the plug 12.

The port system for carrying the packing material further includes an annular groove 26 above the passage 11 and an annular groove 27 below the passage 11. The upper groove 26 is preferably formed in the boss 20 of the head 17. The groove 26 may be provided in the periphery of the boss 20 and as illustrated may be a flat-walled groove of substantial depth. The groove 26 is annular and continuous extending completely around the boss 20. A reduced passage or slot 28 extends downwardly from the groove 26 to the lower end of the boss 20. The slot 28 is formed in the periphery of the boss 20 being provided by reducing the external diameter of the lower portion of the boss. Thus the slot 28 is a downwardly extending continuation of the groove 26. It will be observed that the wall of the cylindrical opening 15 serves to close or define the outer side of the groove 26 and its slot 28. The groove or slot 28 terminates at the lower face of the boss 20 so that the packing P extruded therefrom seals against the upper face or end of the plug 12, forming an annular gasket between the end of the plug and the bottom of the boss 20. This sealing gasket prevents the leakage of fluid pressure at or past the upper end of the plug 12. The packing P in the groove 26 and the slot 28 of course seals between the boss 20 and the wall of the opening 15 to prevent the upward leakage of fluid around the boss, thus eliminating the necessity for gaskets or sealing means between the head 17 and the upper end of the body 10. The groove 26 forms a packing supply chamber for the slot 28 and a pressure equalizing chamber behind the slot 28 and further forms a distributing channel for carrying the packing P to the vertical ports 24. Short lateral ports 29 of ample capacity are formed in the body 10 to connect the groove 26 and the upper portions of the ports 24, see Figs. 3 and 4. The packing P under high pressure is supplied to the groove 26 and the ports 24 by a means to be later described.

The lower packing groove 27 of the means 13 occurs at the lower end of the plug 12 and a ring 30 is arranged in the lower portion of the opening 15 to assist in defining the groove 27. In the construction being described the ring 30 is a separate or individual part of heavy construction force-fitted or otherwise secured in the opening 15 to bear on the seat 21. The ring 30 presents a flat upper face which opposes the lower end of the plug 12. The groove 27 is similar in shape to the groove 26 but is inverted relative to the groove 26 and formed principally in the body 10. The groove 27 is annular and continuous and of substantial capacity. The groove 27 is formed with an extension or annular slot 31 leading upwardly to the upper surface of the ring 30. The inner portion of the groove 27 and the slot 31 are formed by reducing the external diameter of the upper part of the ring 30. The slot 31 has its upper end in opposition to the lower face of the plug 12 where the lower end of the plug joins the periphery of the plug. The walls defining the slot 31 are preferably vertical and concentric. The annular gasket of metallic packing P forced from the mouth of the slot 31 seals between the face of the ring 30 and the lower end of the plug 12 to prevent the leakage of fluid under the plug. The packing P in the groove 27 and the slot 31 effectively seals about the ring 30 to prevent the leakage of fluid under the ring. As will be seen from an inspection of Fig. 4 the groove 27 passes through or terminates the slots 25 and joins or communicates with the axial ports 24. Thus the ports 24 serve as delivery passages conducting the packing P to the groove 27. The four equally spaced ports 24 supplying the packing material P to the groove 27 assure an even distribution of the packing and an equalized pressure on the packing throughout the groove 27. It is to be noted that the pressure on the packing P at the vertical slots 25 is diametrically balanced while the packing pressures at the slots 28 and 31 are axially opposed and balanced so that no unequal pressures are exerted on the plug 12 by the packing P to interfere with the free turning of the plug. The body 10, the plug 12, the head 17 and the ring 30 are of heavy construction at the ports 24, slots 25, grooves 26 and 27 and the slots 28 and 31, so that the packing P occupying the port and groove system may be put under very high pressures without distorting the structure. In practice the packing P may be placed under a pressure of 20,000 pounds per square inch or more.

The means for supplying the packing P to the port and groove system described above, and for putting the packing P under pressure may, of course, be varied considerably. It is preferred to provide the plug stem 22 with the pressure developing means and packing supply means. A longitudinal opening 32 enters the stem 22 from its upper end and extends downwardly to a point adjacent the plug 12, see Fig. 1. A cylinder sleeve 33 lines the opening 32. The sleeve 33 has an upper portion threaded in the opening 32 and has a flange 34 bearing on the upper end of the stem 22. The lower end of the cylinder sleeve 33 is spaced above the bottom of the opening 32 to form a downwardly facing shoulder 35. The sleeve 33 being spaced above the bottom of the opening 32 leaves a substantial packing supply chamber. Two diametrically opposite ports 36 extend downwardly and outwardly in the stem 22 from the lower supply portion of the opening 32, see Fig. 4. The outer ends of the ports 36 are adapted to communicate with supply ports or delivery ports 37 in the body head 17. There are four equally spaced ports 37 leading downwardly and outwardly to the groove 26. The ports 37 join the groove 26 at the lateral ports 27 so that the packing material or packing P is delivered to both the groove 26 and the vertical ports 24. An annular groove 22ᵃ is formed in the stem 22 to join or partially register with the ports 36. The packing P in the groove 22ᵃ seals about the stem 22 and it is unnecessary to provide a packing gland for the stem 22.

A ram or plunger 38 enters the cylinder sleeve 33 from its upper end and is threaded in a nut 39 suitably secured to the upper part of the sleeve 33. In practice the nut 39 may be threaded on the sleeve 33 to bear against the flange 34. A suitable hand wheel 40 is secured to the upper end of the plunger 38. The plunger 38 is adapted to be actuated downwardly or inwardly to compress the packing P and to put the packing in the port and groove system under the desired operating pressure. It may be desired to provide a check valve means to prevent a substantial reduction in the pressure on the packing P in the port and groove system when the plunger 38 is backed off or removed. This means may comprise a shiftable check valve 41 in the open lower portion of the opening 32 for sealing upwardly against the shoulder 35. The valve 41 is guided by a grooved stem 42 operating in the cylinder sleeve 33. The valve 41 floats in or moves with the packing P and when the packing tends to flow back into the cylinder sleeve 33 the valve moves against the shoulder 35 to stop or limit this reverse flow.

The invention includes a novel and very effective bleeder means or test means for determining the condition of the valve. This bleeder means includes a chamber 60 in the ring 30 and a similar chamber 61 in the underside of the head boss 20 in surrounding relation to the stem 22. The chambers 60 and 61 are adapted to receive any leakage there may be at the ends of the plug 12. A vertical offset port 62 extends through the plug 12 and connects the chambers 60 and 61. A port 63 extends upwardly through the boss 20 and into the head 17 to join a horizontal angular port 64. The horizontal port 64 leads to a vertical opening 65 in the head 17. A port 66 extends downwardly from the opening 65 to join a horizontal port 67. This structure is illustrated in Fig. 5. The port 67 communicates with the opening 15 at one side of the longitudinal axis of the valve and at a point where it has communication with the opening 9 of the plug 12 when the plug is in the closed position. This relationship is illustrated in Fig. 3. A radial discharge bleeder opening 68 extends outwardly from the opening 65 to the periphery of the head 17.

A plug 69 is threaded in the opening 65 and has an annular groove 70 between its ends communicating with the port 64 and the discharge opening 68. A longitudinal opening 71 extends upwardly in the plug 69 and has its lower end in communication with the vertical port 66. One or more lateral openings 72 are formed in the plug 69 to put the port 71 in communication with the annular groove 70. Leakage fluid from the chambers 60 and 61 flows through the horizontal port 64 and the groove 70 to the discharge opening 68. Fluid that may leak around the plug 12 is received in the opening 9 and flows through the ports 67, 66, 71 and 72 to discharge into the groove 70 and opening 68. A gasket 73 is arranged at the inner end of the plug 69 to seal with the top of the body 10 and the wall of the opening 65. A tubular extension 74 is provided on the lower end of the plug 69 and passes through the gasket 73 to enter the port 66. The extension 74 centralizes the gasket 73 and retains the gasket in a position where it cannot close off the port 66. A lock nut 75 is threaded on the projecting portion of the plug 69 to clamp against the upper end of the head 17. A test valve or bleeder valve 77 is provided at the outer end of the discharge opening 68. The valve 77 may be normally closed and when it is desired to determine if there is leakage the valve 77 may be opened. As above described, fluid that may leak to the ends of the plug 12 and fluid that may leak around the plug 12 is delivered to the discharge opening 68. In other words, there is a single or common bleeder port system terminating at the opening 68 and controlled by the valve 77. This provides for the full testing of the plug cock by the operation of the single valve 77. In most cases it is desired to test the plug cock when the plug 12 is in the closed position.

In the alternative or modified construction illustrated in Fig. 6 of the drawings a ring part 30ª corresponding to the above described ring 30 is formed on a plate or cap 50. The cap 50 is secured to the lower end of the body 10ª by studs 51 and nuts 52 to close the lower end of the body opening 15ª. The ring part 30ª may be an upstanding annular continuation of the cap 50 and may occupy the lower part of the cylindrical opening 15ª. The upper end of the ring part 30ª is flat to oppose the lower face of the plug 12. The periphery of the ring part 30ª is shaped to define the inner wall of the groove 27ª and the slot 31ª. It will be seen that the ring part 30ª performs the same functions as the above-described ring 30.

The construction of Fig. 6 is characterized by flared or tapered axial ports 24ª corresponding in location and function to the above described ports 24. The axial or vertical ports 24ª are designed to assure the unrestricted delivery of the packing P to the groove 27 and the slots 25ª. The ports 24ª are tapered or formed to have downwardly flaring walls so that they are of downwardly increasing capacity. Prior to the attachment of the cap 50 to the body 10ª the tapered ports 24ª are easy of formation. The packing P delivered to the upper ends of the ports 24ª has a greater freedom of movement as it moves downwardly in the tapered ports and the special formation of the ports provides for the easier movement of the solid packing.

In use or operation it will be assumed that the port and groove system of the means 13 and the pressure developing means are charged with the packing P. The packing P completely occupies all portions of the port and groove system and the ports 39, 36 and 37 for supplying said system. The packing may be introduced into the cylinder sleeve 36 in the form of pellets or sticks and upon introduction and operation of the plunger 38 the packing is compressed and forced through the ports. To condition the valve for operation the plunger 38 is screwed down to put the packing P under a very high pressure. This pressure may of course vary with different operating conditions but is preferably very great, say, 20,000 pounds per square inch. This high pressure on the packing P makes the normally solid packing slightly plastic or formable and causes the packing to discharge at the mouths of the narrow slots 25, 28 and 31. It is to be assumed, of course, that the plug 12 is either in the fully closed position or the fully opened position when the packing P is subjected to the actuating pressure so that the ports 36 register with the ports 37.

The metallic packing P forced from the mouths of the slots 25, 28 and 31 comes against the periphery and the ends of the plug P and spreads in the clearance space about the plug to form gaskets. These gaskets are tightly engaged against the opposing surfaces of the plug 12 and the body structure and being composed of a solid metallic composition are impervious to and unaffected by the fluid handled. The gasket seals formed at the mouths of the slots 25 prevent circumferential leakage about the plug 12 at both the downstream and upstream sides of the plug while the gaskets formed at the mouths of the slots 28 and 31 form seals about the opposite ends of the plug to prevent leakage at these points. Further, the gaskets formed at the mouths of the slots 28 and the packing P in the grooves 26 prevent fluid from leaking under the head 17. If the plug 12 remains in, say, the closed position for a long period it may be desirable to thread the plunger 38 down from time to time to assure the maintenance of the gasket seals.

When the plug 12 is to be turned the stem 22 is engaged by a suitable turning tool and the plug is moved to the selected position. If desired, the plunger 38 may be threaded out a short distance prior to this plug turning operation, although this is not essential. The plug 12 being cylindrical and fitting a cylindrical opening 15 with clearance, turns readily. The packing P forming the sealing gaskets as above described, usually embodies graphite, lead, grease, etc. and merely wipes the surface of the plug as the plug turns without offering appreciable resistance to turning of the plug. The plug 12 clears itself and is free when turned. Turning of the plug 90° to bring it either to the open or closed position re-registers the ports 36 with a set of ports 37 so that the packing P in the port and groove system may again be put under high pressure to develop the sealing gaskets.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A plug cock comprising a body having a fluid passage and an opening intersecting the passage, a plug in the opening turnable between open and closed positions, and means for sealing with the plug comprising narrow grooves in the body extending axially of the opening at opposite sides of the passage and open at the wall of the opening, there being annular narrow grooves at the upper and lower ends of the opening in communication with the axial grooves and opposing the ends of the plug, and there being chambers of substantial capacity and joining the inner parts of the first and second named grooves, packing material occupying the grooves and chambers plastic only under high pressures, and means for subjecting the packing material to high pressures to be extruded from the grooves to form narrow sealing gaskets against the plug.

2. In a plug cock, a body having a fluid passage and an opening intersecting the passage, a turnable plug in the opening for controlling the passage, an end wall of the opening having a narrow annular groove with its outer end opposing an end of the plug and a chamber of substantial capacity at the inner end of the groove, metallic packing in the groove and chamber formable at high pressures, and means for subjecting the packing to high pressures to be extruded from the chamber through the groove to form a narrow gasket between said end wall and said end of the plug.

3. In a plug cock, a body having a fluid passage and an opening intersecting the passage, a turnable plug in the opening for controlling the passage, a part in an end of and closing the opening, the inner end of the part opposing an end of the plug, there being a chamber between the periphery of said part and the wall of the opening spaced from the inner end of the part, the part being reduced in external diameter to leave a slot of reduced width which leads from the chamber to the inner end of said part to have its end opposing said end of the plug, packing material in said chamber and slot normally solid and only plastic at very high pressure, and means for putting the packing under high pressure to seal between said part and the wall of the opening and to extrude the packing from the reduced slot to form a narrow sealing gasket which seals against said end of the plug.

4. In a plug cock, a body having a fluid passage and an opening intersecting the passage, a turnable plug in the opening for controlling the passage, parts in the ends of the opening, the inner ends of said parts opposing the ends of the plug, closures for the ends of the body carrying said parts, there being spaces between the wall of the opening and the peripheries of said parts forming annular chambers of substantial capacity spaced from the inner ends of the parts and slots of reduced width leading from said chambers to the inner ends of said parts so that their ends face the adjacent ends of the plug, metallic packing in the chambers and slots formable only under high pressure, and means for subjecting the packing to high pressures to extrude the packing from the slots so that the packing forms narrow sealing gaskets against the ends of the plug.

5. In a plug cock, a body having a fluid passage and an opening intersecting the passage, a turnable plug in the opening for controlling the passage, the end parts of the body having chambers of substantial capacity and slots considerably narrower than the chambers and leading from the chambers to the ends of the opening to have their ends face the adjacent ends of the plug, the wall of the body having axial ports of substantial capacity at opposite sides of the passage connecting with said chambers and narrow axial grooves joining the ports with the opening, metallic packing in said chambers, slots, ports and grooves normally solid and plastic only under high pressure, and means for subjecting the packing to high pressures to extrude it from the slots and grooves to form narrow sealing gaskets against the plug.

6. A plug cock comprising a body having a fluid passage and an opening intersecting the passage, a plug in the opening turnable between open and closed positions, and means for sealing with the plug comprising parts in the end portions of the opening whose ends oppose the ends of the plugs and whose peripheries are spaced from the wall of the opening leaving chambers of substantial capacity and narrow annular slots which lead from the chambers to the inner ends of the parts to oppose the ends of the plug, ports of substantial capacity in the body extending axially of the opening at opposite sides of the passage and connecting with the chambers, narrow axial slots in the body joined with the ports and communicating with said opening, packing in the chambers, ports and slots normally solid and plastic only under high pressure, and means communicating with the chambers and ports for putting the packing under pressure to form sealing gaskets at the mouths of the slots.

7. A plug cock comprising a body having a fluid passage and an opening intersecting the passage, a plug in the opening turnable between open and closed positions and means for sealing with the plug comprising parts in the end portions of the opening whose inner ends oppose the ends of the plug and whose peripheries are shaped to leave chambers of substantial capacity spaced from the inner ends of the parts and narrow annular slots which lead from the chambers to the inner ends of said parts to oppose the ends of the plug, ports in the body walls of substantial capacity extending axially of the opening at opposite sides of the passage and connecting with the chambers, narrow axial slots in the body joined with the ports and communicating with said opening, a stem on the plug, metallic packing in the slots, ports and chambers plastic only at high pressures, and means in the stem communicating with the chambers and ports for placing the packing under pressure so that the packing forms metallic gaskets at the slots for sealing with the plug.

8. A plug cock comprising a body having a fluid passage and an opening intersecting the passage, a plug in the opening turnable between open and closed positions, and means for sealing with the plug comprising parts in the end portions of the opening whose peripheries are spaced from the wall of the opening leaving slots which oppose the ends of the plug, there being narrow axial grooves in the wall of the opening at opposite sides of the passage, the grooves connecting with the slots, the body having tapered axial ports joined with the inner ends of the grooves and of larger capacity than the grooves, packing in the slots, grooves and ports normally solid and plastic only under high pressure, and means communicating with the ports for putting the packing under pressure to form sealing gaskets at the mouths of the slots and grooves.

9. A plug cock comprising a body having a fluid passage and an opening intersecting the passage, a plug in the opening turnable between open and closed positions, and means for sealing with the plug comprising parts in the end portions of the opening whose inner ends oppose the ends of the plug and whose peripheries are spaced from the wall of the opening and shaped to leave chambers of substantial capacity and narrow annular slots which lead from the chambers to the inner ends of said parts to oppose the ends of the plug, walls in the body forming ports of substantial capacity extending axially of the opening at opposite sides of the passage and connecting the chambers, walls in the body forming narrow axial slots connecting the ports with the opening, packing in the slots, chambers and ports normally solid and plastic only under high pressure, means for putting the packing under pressure to form sealing gaskets at the slots and grooves, and a single valve controlled bleeder port system for bleeding leakage fluid from both ends of the opening.

10. A plug cock comprising a body having a fluid passage and an opening intersecting the passage, a plug in the opening turnable between open and closed positions, means for sealing with the opposite ends of the plug, means for sealing with the plug at opposite sides of the passage and joining the first named sealing means, the body having a system of ports for bleeding leakage fluid from around the plug and from the opposite ends of the plug, and a bleeder valve for controlling the outlet of said system of ports.

11. A plug cock comprising a body having a fluid passage and an opening intersecting the passage, a plug in the opening turnable between open and closed positions, and means for sealing with the opposite ends of the plug, means for sealing with the plug at opposite sides of the passage and joining the first named sealing means, a port system in the body including a port communicating with opposite ends of the opening and a port communicating with the opening between the upstream and downstream ends of the passage, and a single bleeder valve for the port system.

SAMUEL C. CARTER.